United States Patent

[11] 3,603,080

| [72] | Inventor | James W. McCrocklin |
| | | Alexandria, Va. |
| [21] | Appl. No. | 836,428 |
| [22] | Filed | June 25, 1969 |
| [45] | Patented | Sept. 7, 1971 |
| [73] | Assignee | A. S. Callaway |

[54] EMMISSION CONTROL ASSEMBLY
8 Claims, 4 Drawing Figs.

[52] U.S. Cl. ............................................. 60/30, 23/277
[51] Int. Cl. ............................................. F01n 3/14
[50] Field of Search ............................................. 60/29, 30; 23/2 C, 277 C

[56] References Cited
UNITED STATES PATENTS

| 1,605,484 | 11/1926 | Thompson | 60/29 |
| 1,848,990 | 3/1932 | Boyd | 60/30 |
| 2,829,730 | 4/1958 | Barkelew | 60/30 |
| 2,851,852 | 9/1958 | Cornelius | 60/30 |
| 3,285,709 | 11/1966 | Eannarino | 60/30 |
| 3,435,613 | 4/1969 | Eannarino | 60/30 |

*Primary Examiner*—Douglas Hart
*Attorney*—H. Fred Starobin

ABSTRACT: Inner and outer housings of a combined muffler and emission control device define a passageway for incoming air. Exhaust gas is introduced into the inner housing and is mixed with a portion of the incoming air whereafter it is ignited and then mixed with further incoming air. The burning gas is used to preheat the incoming air by heat exchange through a wall of the inner housing and flow reversal within the inner housing is employed to produce an acoustical muffling effect.

INVENTOR
JAMES W. McCROCKLIN

BY Spencer & Kaye
ATTORNEYS.

INVENTOR
JAMES W. McCROCKLIN
BY Spencer & Kaye
ATTORNEYS.

EMMISSION CONTROL ASSEMBLY

BACKGROUND OF THE INVENTION

The emission of unburned hydrocarbon and carbon monoxide components in the exhaust gases emanating from internal-combustion engines is known to constitute a major source of air pollution in many localities and various proposals have been offered for lowering the level of such emission.

The internal-combustion engines used to power vehicles operate over a wide range of conditions of load and engine speed and several of these conditions are particularly conducive to the emission of high percentages of unburned hydrocarbons and carbon monoxide in the engine exhaust gas. In fact, almost any condition other than constant speed under moderate load will produce unacceptable levels of unburned hydrocarbons and carbon monoxide in the exhaust gas. However, the different unacceptable emission-producing conditions display different and unique characteristics which, although they may be dealt with individually, have for the most part defied efforts directed toward providing a single device or system which will reduce the emission to acceptable levels under all of these conditions. Thus, for example, a system which reduces the emission under engine idling no load conditions may be woefully inadequate during conditions of acceleration under load or deceleration under load, etc.

In addition the time history of engine operation introduces other variables with which difficulty is encountered. For example, the problems encountered in controlling emission of unburned hydrocarbons and carbon monoxide with respect to an engine which has been started after a long period of inactivity and which therefore is operating relatively "cold" are specifically different from the problems encountered with the same engine after it has come up to operating temperature.

Furthermore, no matter what proposal is offered, it must not only be efficient in terms of emission control, but also it must be capable of continuing operation substantially at its initial level of efficiency without requiring an inordinate amount of maintenance and, in addition, all of this must be accomplished within the realm of reasonable initial cost.

SUMMARY OF THE INVENTION

Accordingly, it is an object of this invention to provide a device for reducing the emission of unburned hydrocarbons and carbon monoxide to acceptable levels in the exhaust gas of an internal-combustion engine, which device is operative under the most adverse circumstances or conditions of engine operation.

Specifically, the present invention is directed to a device of the afterburner type which is effective to complete the combustion of unburned hydrocarbons and carbon monoxide sufficiently well as to reduce these components to acceptable levels.

The present invention relates to an emission control device of the afterburner type in which efficient preheating of the incoming air is effected prior to its admixture with the exhaust gas so as to permit ignition to be initiated and sustained whereby there is substantially complete combustion of unburned hydrocarbons and carbon monoxide under any operating condition of the engine.

In addition, the present invention relates to a device as described above wherein the preheating effect is achieved by flow reversal of the burning gases within the device so that an acoustical muffling effect is also achieved.

Essentially, the device includes an inner and an outer housing defining a flow passageway therebetween for incoming air which is introduced together with the incoming exhaust gas into one end of the inner housing. The incoming air is branched or split and introduced at axially spaced points within the innner housing. Ignition of the admixture of exhaust gas and incoming air from the first branch is effected by an ignition device located either between the two points of incoming air introduction or upstream of both within a stagnant air space. The burning gas scrubs along the inner surface of the tubular wall of the innner housing to effect efficient transfer of heat to the incoming air. The burning gas may be directed to a flow-reversing baffle and skirt arrangement which ultimately directs the burning gas to scrub along the inner surface of the tubular wall of the inner housing.

DESCRIPTION OF THE PREFERRED EMBODIMENTS

Figure 1:
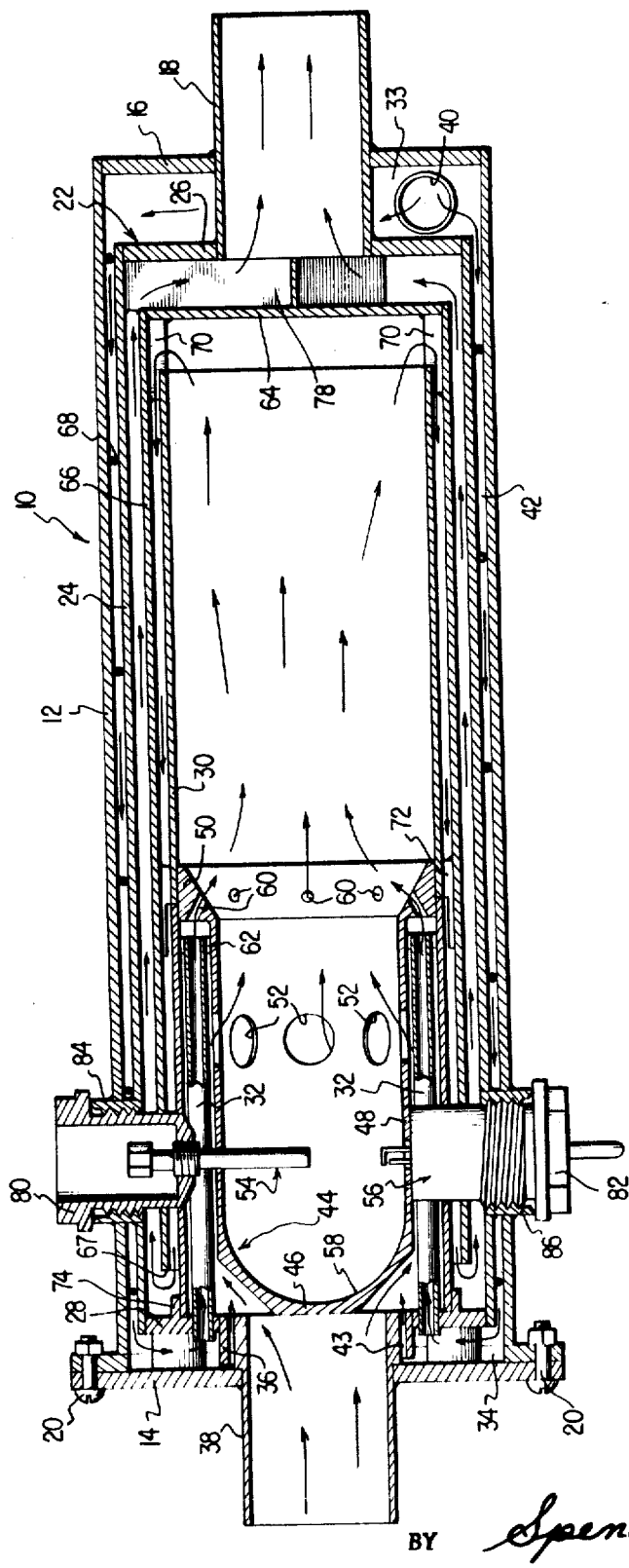
FIG. 1 is a longitudinal section taken through a combined acoustical muffler and emission control device constructed according to the present invention.

With reference to FIG. 1, reference numeral 10 indicates generally the outer housing assembly which will be seen to include a tubular sidewall 12 closed at one end by the end wall 14 and at its other end by the end wall 16. The end wall 16 is provided with an opening through which the outlet conduit 18 passes and which is welded thereto as shown with the end wall 16 also being suitably affixed as by welding to the sidewall 12, whereas the end wall 14 as shown is detachably secured to the sidewall 12 by fasteners 20 so as to permit assembly and disassembly of the component parts of the device. It will be understood that the complete assembly may, however, be of unitary welded construction.

Figure 4:
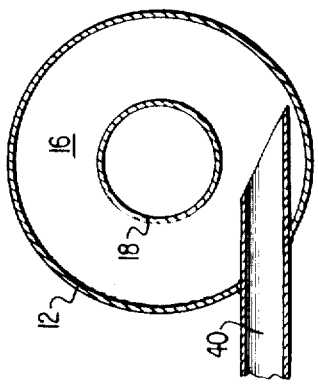
FIG. 4 is a cross section taken substantially along the plane of section line 4—4 in FIG. 2.

DIsposed within the outer housing 10 is an inner housing assembly indicated generally by the reference character 22 and which will be seen to include the cylindrical or tubular sidewall 24 which is spaced substantially uniformly inwardly with respect to the tubular sidewall 12 of the outer housing 10. In addition, the inner housing includes the end wall 26 through which the previously mentioned outlet conduit 18 projects so as to communicate with the interior of the inner housing at the corresponding end of the device. The end wall 28 is provided for the sidewall 24 at the inlet end of the device and the end wall 28 mounts a longitudinally extending sleeve 30 as well as a series of circumferentially spaced tubes 32. The opposite ends of the inner housing are spaced inwardly from the corresponding opposite ends of the outer housing to present the inlet chamber 33 and the manifold chamber 34, the latter of which communicates with the previously mentioned tubes 32 and, as well, with the interior of the inner housing by means of the passageway formed between the tube 36 and the corresponding inner end of the inlet conduit 38. Consequently, inlet air pumped into the inner housing through the tangentially disposed inlet tube 40 (FIG. 4) flows in swirling fashion first into the chamber 33 and then spirally down the passageway 42 provided between the tubular sidewalls 12 and 24 into the manifold chamber 34 where it is split so that part of it passes through the passageway 43 between the tube 36 and the inlet conduit for direct admixture with the incoming exhaust gases passing through the inlet conduit 38 whereas the remaining portion of the incoming air is directed down the tubes 32.

Within the inlet end of the inner housing is provided a burner chamber device in the form of a cup indicated generally by the reference character 44 having its closed end 46 facing the inner end of the inlet conduit 38 and including a cylindrical skirt 48 terminating in a flanged end 50 secured to the inner surface of the sleeve 30, as shown. The skirt 48 is provided with a series of openings 52 allowing the primary admixture of incoming air and exhaust gases to enter into the interior of the burner chamber device 44 wherein this primary mixture is ignited. The ignition may be effected by one or more suitable ignition devices such as a glow plug or spark plug 56 which is located between the openings 52 and the semispherical inner surface 58 of the burner chamber device so that the stagnant or relatively quiescent gas flow region, within which the ignition devices are located, allows the initiation and maintenance of a flame to burn the primary mixture. At least one, and preferably several, flame holding rods 54 are provided. It will be appreciated that a series of circumferentially spaced similar igniting devices may be provided. The burning mixture is then passed through the open end of the chamber device 44 whereat it is admixed with additional incoming air discharged from the tubes 32 and passing through the flange 50 through the inwardly directed openings and passages 60 thereof. The inner free ends of the tubes 32 pass through openings in the ring 62.

The burning gases pass axially through the shell portion 30 and encounter the baffle plate 64 of a flow-reversing device which includes, in addition to the baffle plate 64, the skirt 66 which surrounds the sleeve 30 and extends towards the inlet end of the device but terminates short thereof as indicated by the reference character 67 to allow the burning gases then to again reverse direction and pass between the skirt 66 and the tubular sidewall 24 of the inner housing, thereby to scrub against the inner surface of the tubular sidewall 24 and effect preheating of the incoming air passing between the chambers 32 and 34 by heat transfer through the wall 24 of the inner housing.

The passage of the incoming air between the sidewalls 12 and 24 is effectively lengthened by the provision of a wire 68 or other suitable means extending helically around and secured to the sidewall 24 of the inner housing and extending substantially between the inner and outer housings as shown. The sleeve 30 may be supported directly from the flow-reversing mechanism by the series of ears 70 and the ears 72 and from the end wall 28 of the inner housing by overlapping engagement with the flange 74 formed on the end wall 28, the flow-reversing mechanism being supported directly from the inner housing by means of the Y-shaped support 78.

The ignition device 56 and flame-holding rod 54 may be threadedly engaged with the sleeves 80 and 82 which are threaded in sleeves 84 and 86 which project through and bridge between the inner and outer housings as shown and which may be welded thereto. The flame-holding rod may be simply welded or riveted in place in lieu of using sleeves 80 and 84.

Figure 2:
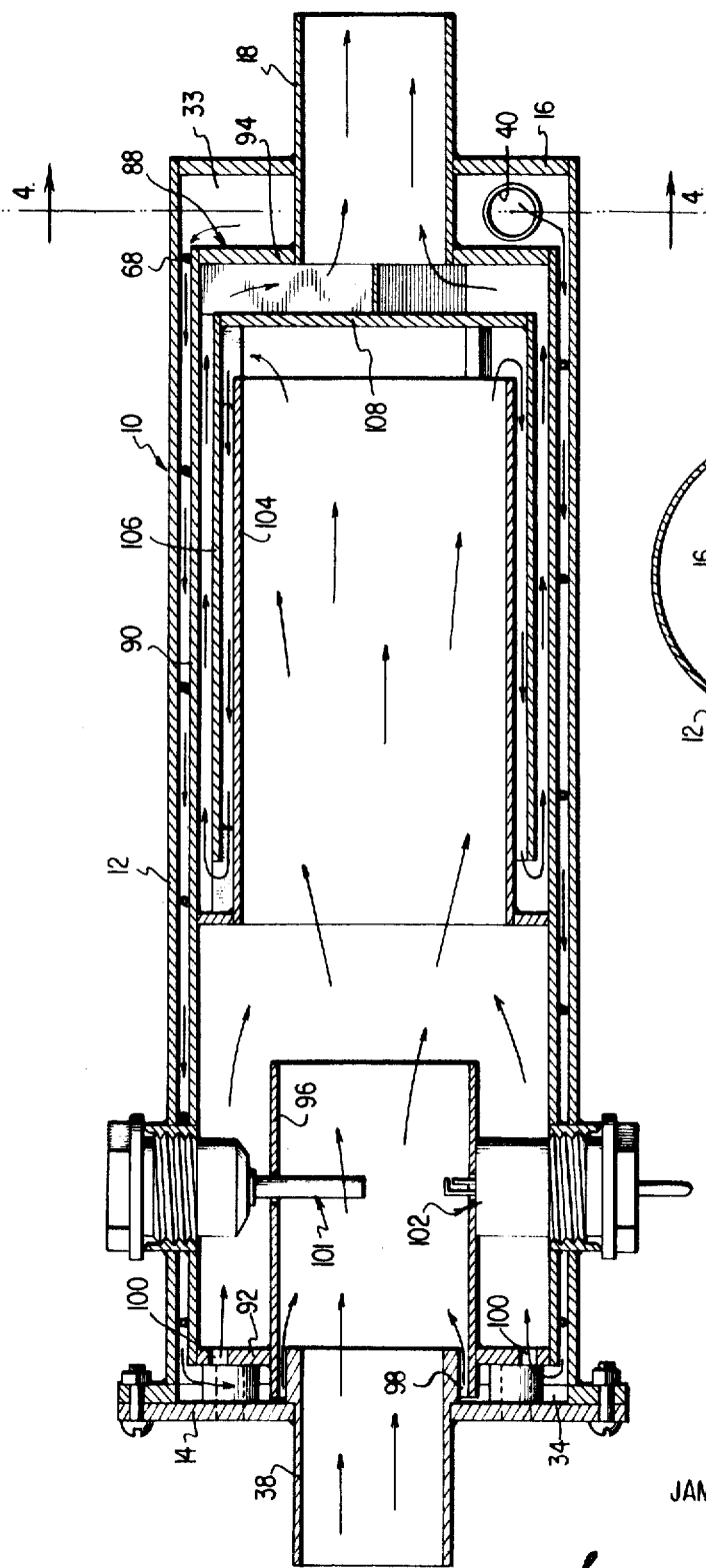
FIG. 2 is a view similar to FIG. 1 but showing a modified form of the invention.

In the form of the invention shown in FIG. 2, the inner housing 88 includes the tubular sidewall 90 similar to that described in conjunction with FIG. 1 closed at its opposite ends by the respective sidewalls 92 and 94. In the modification of FIG. 2, however, the burner chamber is formed by a sleeve 96 which is of larger diameter than the inner end of the inlet conduit 38 to form the primary incoming air passage 98 leading directly into the interior of the sleeve 96. Secondary introduction of incoming air is effected through openings 100 in the end wall 92 flowing outside around the sleeve 96 and comingling with the burning primary mixture effected by ignition devices such as the spark plug 102 located within the sleeve 96, substantially as is shown and flame-holding rod or rods 101. The flow-reversing passage means is effected by the sleeve 104 downstream from the sleeve 96 and the surrounding skirt 106 of the flow reverser whose baffle plate is indicated by the reference character 108. Thus, in this embodiment of the invention, the ignition takes place between the axially spaced regions of incoming air introduction but, as before, serves to ignite the primary mixture.

Figure 3:
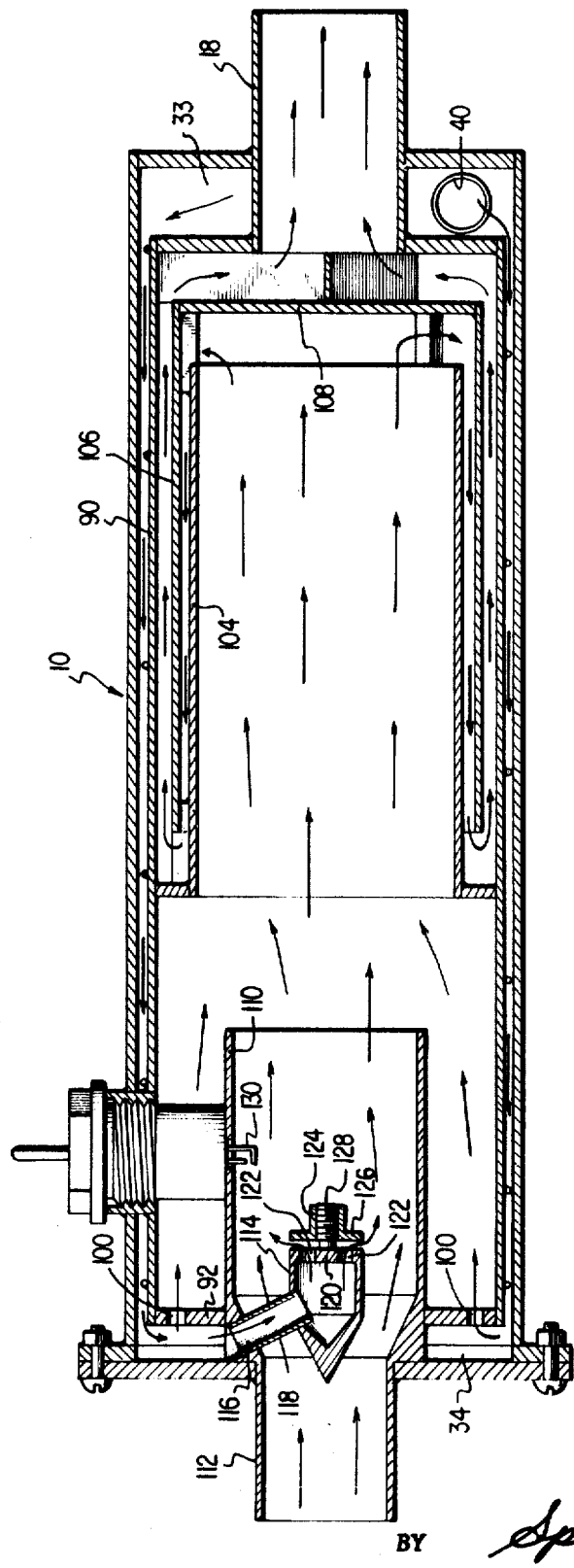
FIG. 3 is a view similar to FIGS. 1 and 2 but showing a still further modified form of the invention.

In the embodiment shown in FIG. 3, the burner chamber sleeve 110 is formed as an axial extension of the inlet conduit 112 and located within the inner end of the burner sleeve 110 is a hollow body 114 having an inlet tube 116 leading to the manifold chamber 34. The upstream end 118 of the body 114 is tapered to provide smooth gas flow therepast whereas the downstream end of the body is in the form of a flat plate 120 provided with a series of circumferential openings 122 therein. A baffle nut 124 having a radial flange 126 is threadedly engaged on the stud 128 so as to be disposed in properly spaced relationship from the plate 120 and to cooperate with the openings 122 to direct the primary incoming air radially within the sleeve 110 so as to form good admixture with the incoming exhaust gas and to effect a flame-holding action. Downstream of the body 114 one or more ignition devices 130 and if desired a flame-holding rod or rods may be provided and the secondary incoming air, as in the embodiment shown in FIG. 2, passes through the openings 100 in the end wall 92 of the inner housing, around the sleeve 110 to comingle with burning primary mixture.

In the embodiments shown, sufficient incoming air is provided to effect substantially complete combustion of the unburned hydrocarbons and carbon monoxide in the exhaust gas under all operating conditions of the engine. For this purpose, the incoming air is supplied by a pump driven at or proportional to engine speed and having sufficient capacity to supply the requisite amount of incoming air under all conditions. The incoming air is heated to a temperature in the order of 1,000° F. and the amount of incoming air which is mixed with the exhaust gas is restricted such that the primary mixture of incoming air and exhaust gas is at a temperature of at least about 1,700° F. This temperature is sufficient to assure ignition of the primary mixture whereafter the remaining portion of the incoming air is introduced so that the total amount of incoming air is effective to assure substantially complete combustion of the unburned hydrocarbons and carbon monoxide.

Since the mass rate of exhaust gas flow is dependent not only upon engine speed but also upon engine load, the pump for incoming air may be controlled as to volumetric output as a function of inlet manifold vacuum as well as a function of engine speed. Ideally, the pump will deliver just that mass rate flow of incoming air as will substantially assure theoretically complete combustion of unburned hydrocarbons and carbon monoxide in the exhaust gas. In this way, the cooler incoming air forms the primary mixture with the incoming exhaust gas so that the primary mixture is at a temperature not less than about 1,700° F. This is particularly important in assuring efficient emission control under conditions in which the engine is cold and has not as yet come up to operating temperature since, under these conditions, the exhaust gas will tend to be cooler, and many passenger automobiles in particular are operated a substantial part of the time under circumstances in which the engine has not reached normal operating temperatures.

It should be noted that the present invention is not to be limited to the specific elements shown and described herein but is subject to modification. For example, the parts can be assembled in a manner which allows for disassembly, or can be completely welded together with no threaded connections. The ignition device can be threaded into the housing or can be permanently positioned in place, as can the flame-holding rods. Also, the spiral air passage can be formed in other manners than by the use of wire as disclosed hereinabove.

I claim:

1. A combined acoustical muffler and afterburner device for effecting substantially complete combustion of unburned hydrocarbons and carbon monoxide which may be present in the exhaust gas of an internal-combustion engine, comprising, in combination:

an elongate outer housing;
an elongate inner housing disposed within said outer housing, said inner and outer housings having tubular sidewalls defining a passageway therebetween;
an inlet conduit for exhaust gas projecting through one end of said outer housing and discharging into the corresponding end of the inner housing;
an outlet conduit extending from the other end of said inner housing through the corresponding end of said outer housing;
flow-reversing passage means within said inner housing including a skirt spaced inwardly from said tubular sidewall of the inner housing and defining a heat exchange passage therewith leading to said outlet conduit;

means for introducing air into said outer housing adjacent the other end thereof;

means for directing air from said outer housing adjacent said one end thereof into said inner housing for admixture with exhaust gas discharged into the latter, whereby the incoming air is caused to pass through said passageway before such admixtures;

means for splitting the incoming air into said inner housing into separate branches introduced at axially spaced regions; and means for igniting the admixture within said inner housing so that the incoming air is preheated within said passageway.

2. The combined muffler and afterburner device as defined in claim 1 wherein said means for igniting is located between said regions.

3. The combined muffler and afterburner device as defined in claim 1 wherein said means for igniting is located upstream from both of said regions.

4. A combined acoustical muffler and afterburner device for effecting substantially complete combustion of unburned hydrocarbons and carbon monoxide which may be present in the exhaust gas of an internal-combustion engine, comprising, in combination:

an elongate outer housing forming an enclosure;

an elongate inner housing disposed within said outer housing, said inner and outer housings having respective tubular sidewalls disposed in substantially uniformly spaced relation defining a passageway therebetween extending along the length of the device;

an exhaust gas inlet conduit extending axially through said outer housing at one end thereof and discharging into the corresponding one end of said inner housing;

means for introducing air into said outer housing at the other end thereof and said passageway having a first branch communicating with said one end of the inner housing adjacent the region at which exhaust gas is discharged thereinto whereby a portion of the incoming air and exhaust gas are intermixed thereat;

means forming a burner chamber within said one end of the inner housing and into which the aforesaid mixture of a portion of the incoming air and exhaust gas is introduced;

ignition means within said burner chamber for igniting said mixture;

said passageway having a second branch communicating with said inner housing adjacent the discharge end of said burner chamber for introducing additional air into the burning mixture;

a flow reverser comprising a transverse baffle plate adjacent the other end of said inner housing and a skirt extending from said baffle plate toward said one end of the inner housing and inwardly spaced substantially uniformly with respect to said tubular sidewall of the inner housing so as to direct burning gas first toward said one end of the device within said skirt and then in reverse direction outside said skirt in scrubbing contact with said sidewall of the inner housing whereby to so heat the incoming air; and an outlet conduit extending from said other end of the inner housing through the other end of the outer housing.

5. The combined muffler and afterburner device as defined in claim 4 wherein said means forming a burner chamber is in the form of a cup having its closed end facing said inlet conduit and provided with circumferential openings intermediate its ends into which said mixture is introduced, said ignition means being located within said cup between said openings and said closed end.

6. The combined muffler and afterburner device as defined in claim 4 wherein said means forming a burner chamber is in the form of a sleeve aligned axially with said inlet conduit, said sleeve being of larger diameter than said inlet conduit and being overlapped therewith to define said first branch for incoming air.

7. The combined muffler and afterburner device as defined in claim 4 wherein said means forming a burner chamber is in the form of a sleeve forming an extension of said inlet conduit, a hollow body within said sleeve having an inlet communicating with said first branch and an outlet for directing air radially therefrom into said sleeve, said ignition device being located downstream from said body.

8. A combined acoustical muffler and afterburner device for effecting substantially complete combustion of unburned hydrocarbons and carbon monoxide which may be present in the exhaust gas of an internal-combustion engine, comprising, in combination:

an elongate outer housing forming an enclosure;

an elongate inner housing disposed within said outer housing, said inner and outer housings having respective tubular sidewalls disposed in substantially uniformly spaced relation defining a passageway therebetween extending along the length of the device;

an exhaust gas inlet conduit extending axially through said outer housing at one end thereof and discharging into the corresponding one end of said inner housing;

means for introducing air into said outer housing at the other end thereof and into said passageway to flow therein countercurrent to exhaust gas flow;

means forming a burner chamber in the form of a sleeve forming an extension of said inlet conduit, within said one end of the inner housing, a hollow body within said sleeve having an inlet communicating with said passageway and an outlet for directing air radially therefrom into said sleeve;

ignition means within said burner chamber for igniting said mixture;

a flow reverser comprising a transverse baffle plate adjacent the other end of said inner housing and a skirt extending from said baffle plate toward said one end of the inner housing and inwardly spaced substantially uniformly with respect to said tubular sidewall of the inner housing so as to direct burning gas first toward said one end of the device within said skirt and then in reverse direction outside said skirt in scrubbing contact with said sidewall of the inner housing whereby to so heat the incoming air; and an outlet conduit extending from said other end of the inner housing through the other end of the outer housing.